United States Patent
Rittle et al.

(10) Patent No.: US 9,135,427 B2
(45) Date of Patent: Sep. 15, 2015

(54) AUTHENTICATION USING A SUBSET OF A USER-KNOWN CODE SEQUENCE

(71) Applicant: General Instrument Corporation, Horsham, PA (US)

(72) Inventors: Loren J. Rittle, Lake Zurich, IL (US); Shivajit Mohapatra, Arlington Heights, IL (US); Jay J. Williams, Glenview, IL (US); Krunal S. Shah, Chicago, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 13/754,101

(22) Filed: Jan. 30, 2013

(65) Prior Publication Data

US 2014/0215601 A1    Jul. 31, 2014

(51) Int. Cl.
*G06F 12/14* (2006.01)
*G06F 12/00* (2006.01)
*G06F 7/04* (2006.01)
*G11C 7/00* (2006.01)
*G06F 21/36* (2013.01)
*G06F 11/30* (2006.01)
*G06F 15/173* (2006.01)

(52) U.S. Cl.
CPC ..................................... *G06F 21/36* (2013.01)

(58) Field of Classification Search
CPC ......... G06F 21/31; G06F 21/83; G06F 21/53; G06F 21/6218; G06F 2221/2105
USPC .......... 713/168–174, 182–186, 202; 709/225, 709/229; 726/2–8, 16–25
See application file for complete search history.

(56) References Cited

U.S. PATENT DOCUMENTS

| | | | |
|---|---|---|---|
| 5,821,933 A | 10/1998 | Keller et al. | |
| 6,079,021 A | 6/2000 | Abadi et al. | |
| 7,124,433 B2 | 10/2006 | Little | |
| 7,240,367 B2 | 7/2007 | Park | |
| 7,383,572 B2 | 6/2008 | Rolfe | |
| 7,577,987 B2 | 8/2009 | Mizrah | |
| 7,681,228 B2 | 3/2010 | Mizrah | |
| 7,725,099 B2 | 5/2010 | Joho et al. | |
| 8,125,312 B2 | 2/2012 | Orr | |
| 2005/0010768 A1* | 1/2005 | Light et al. ................ | 713/168 |
| 2008/0141345 A1* | 6/2008 | Gavrilos et al. ............ | 726/4 |
| 2008/0214298 A1 | 9/2008 | Byng | |
| 2009/0083847 A1 | 3/2009 | Fadell et al. | |
| 2010/0180336 A1 | 7/2010 | Jones et al. | |
| 2011/0208964 A1 | 8/2011 | Sama | |
| 2011/0283241 A1 | 11/2011 | Miller et al. | |

(Continued)

FOREIGN PATENT DOCUMENTS

WO    2009/121437 A1    10/2009

OTHER PUBLICATIONS

S. Komanduri, et al., "Order and Entropy in Picture Passwords," Proceedings of Graphics Interface 2008, pp. 115-122, Canadian Information Processing Society, May 2008.

(Continued)

*Primary Examiner* — Evans Desrosiers
(74) *Attorney, Agent, or Firm* — Stewart M. Wiener (57) ABSTRACT

Authentication in a system includes presenting information to a user containing a partial sequence of a passcode along with distractors. The user is challenged to identify the partial sequence from among the information in order to gain access to the system.

24 Claims, 8 Drawing Sheets

(56) References Cited

U.S. PATENT DOCUMENTS

2012/0036556 A1 2/2012 LeBeau
2012/0124662 A1 5/2012 Baca et al.

OTHER PUBLICATIONS

Y. Hirakawa, et al., "Pass-Image Authentication Method Tolerant to Video-Recording Attacks," 2011 Federated Conference on Computer Science and Information Systems (FedCSIS), pp. 767-773, IEEE, Sep. 2011.

P. Golle, et al., "Cryptanalysis of a Cognitive Authentication Scheme (Extended Abstract)," 2007 IEEE Symposium on Security and Privacy (SP'07), pp. 66-70, IEEE, May 2007.

W. Jansen, et al., "Picture Password: A Visual Login Technique for Mobile Devices," NISTIR 7030, U.S. Department of Commerce, National Institute of Standards and Technology, Jul. 2003.

Hummingbird Designs, "Partial Passwords—Theory and a Demo Implementation Using PHP and Javascript," HummingBird Design Blog Workshop, URL: <http://www.hbirddesigns.com/~launch/workshops/partial-passwords-theory-and-a-demo-implementation>, Apr. 2011.

R. Dhamija, et al., "Déjà Vu: A User Study Using Images for Authentication," SSYM'00: Proceedings of the 9th USENIX Security Symposium, Berkeley, CA, USA, Aug. 2000.

C. De Jong, et al., "Online Authentication Methods: Evaluate the Strength of Online Authentication Methods," System and Network Engineering (SNE) Master Student Projects 2007-2008, University of Amsterdam, URL: <http://staff.science.uva.nl/~delaat/rp/2007-2008/p30/report.pdf>, 2008.

"Patents and Authentication: Does Revealing the Authentication Process Make It Less Secure?", Technology Exploration Project—M591, University of Portsmouth, School of Engineering, URL: <http://mosaic.cnfolio.com/M591CW2007C107>, Nov. 2007.

S. Man, et al., "A Shoulder-Surfing Resistant Password Scheme", URL: <http://clam.rutgers.edu/~birget/grPssw/manDawei.pdf>, Mar. 2005.

S. Dueck, et al., "Handwavey: A Gestural Motion Password Interface", Proceedings of Human Interface Technologies 2010/11 Fall Conference, University of British Columbia, Canada, Dec. 2010.

M.Z. Jali, "A Study of Graphical Alternatives for User Authentication", Research Thesis, University of Plymouth, UK, 2011.

M.Z. Jali, et al., "A Survey of User Opinions and Preference Towards Graphical Authentication," Proceedings of the Fourth Collaborative Research Symposium on Security, E-learning, Internet and Networking (SEIN 2008), Wrexham, UK, Nov. 2008.

M.Z. Jali, et al., "Evaluating Web-Based User Authentication Using Graphical Techniques," Proceedings of the Third International Symposium on Human Aspects of Information Security & Assurance (HAISA 2009), Athens, Greece, 2009.

M.Z. Jali, et al., "Assessing Image-Based Authentication Techniques in a Web-Based Environment," Information Management & Computer Security 18(1), pp. 43-53, 2010.

M. Jali, et al., "Quantifying the Effect of Graphical Password Guidelines for Better Security", Future Challenges in Security and Privacy for Academia and Industry: Proceedings of 26th IFIP TC 11 International Information Security Conference, SEC 2011, Lucerne, Switzerland, Jun. 7-9, 2011, IFIP Advances in Information and Communication Technology, vol. 354/2011, pp. 80-91, Springer, 2011.

PCT Search Report & Written Opinion, RE: Application #PCT/US201/013765, dated May 12, 2014.

A. Aziz, Dynamically Altering Complexity of Picture Password Entry, IP.com Journal, Apr. 30, 2012, 8 pgs.

J. Lee, "Open Sesame: A Picture Worth 1,000 Passwords", The New York Times Company, Dec. 27, 2001. URL: http://www.nytimes.com/2001/12/27/technology/circuits/27PBOX.html.

\* cited by examiner

AUTHENTICATION USING A SUBSET OF A USER-KNOWN CODE SEQUENCE

BACKGROUND

Authenticated access to computing devices is increasingly important for computer-based devices (such as smartphones, personal data assistants, and the like) and home computer-based devices (such as desktop and laptop computer systems, computer tablets, and so on). Authenticated access to a computing device's functionality is also becoming important. For example, a television set top box or digital video recorder (DVR) may provide various levels of media access (e.g., kids-only television channels, limited playback only or full access on a DVR, and so on). A computing device may have multiple levels of access, for example, user-mode access (e.g., limited to executing already-installed applications) or administrative access (e.g., full access to the computing device; including installing, configuring or removing applications). A computing device may allow multiple users with different user-mode access rights (e.g., a user Alice might be able to make and receive phone calls since she is the primary device owner, but users Jonathon and Oliver may only be able to play games without any network access since they are secondary, underage device users).

Conventional passcode entry systems include using a personal identification number (PIN) as the authentication technique. However, finger oil accumulation on a keypad over time may simplify an attacker's attempts to break a PIN-based security system. Another system uses a connect-the-dots strategy, where the user is presented with a set of images on a touch screen and is challenged to select a pattern of images to authenticate. Again, an attacker may use finger oil accumulation on the touch screen to increase their chances of breaking the security.

Another security risk is the notion of "shoulder surfing". Here, an attacker may simply be an onlooker from behind the user who is entering their passcode into the system. The attacker may simply see the unlock sequence and thus learn the PIN or pattern.

DETAILED DESCRIPTION

In accordance with the present disclosure, an authentication method may include presenting information relating to a portion of a passcode to a user who is requesting computer access; e.g., to logon on to the computer, to access certain functionality on the computer and the like. The information that is presented may include distractor information that is not part of the passcode. Access may be granted when the user selects only the portion of the passcode from among the presented information.

In accordance with the present disclosure, a computer system may include program code that causes a processor to display images on a video display in response to receiving a request for access to the computer system. The images represent portions of a passcode along with distractor information that is not part of the passcode. The computer system may grant the user access when the user selects only portions of the passcode from among the images displayed on the video display.

In accordance with the present disclosure, an authentication method may include presenting to a user a challenge that comprises first and second information. The first information represents only a portion of a passcode, while the second information does not represent any portion of the passcode. A successful response occurs when the user selects only the first information from among the first and second information that is presented to the user.

These and other embodiments and aspects of the present disclosure will now be described in connection with the accompanying figures.

Figure 1:
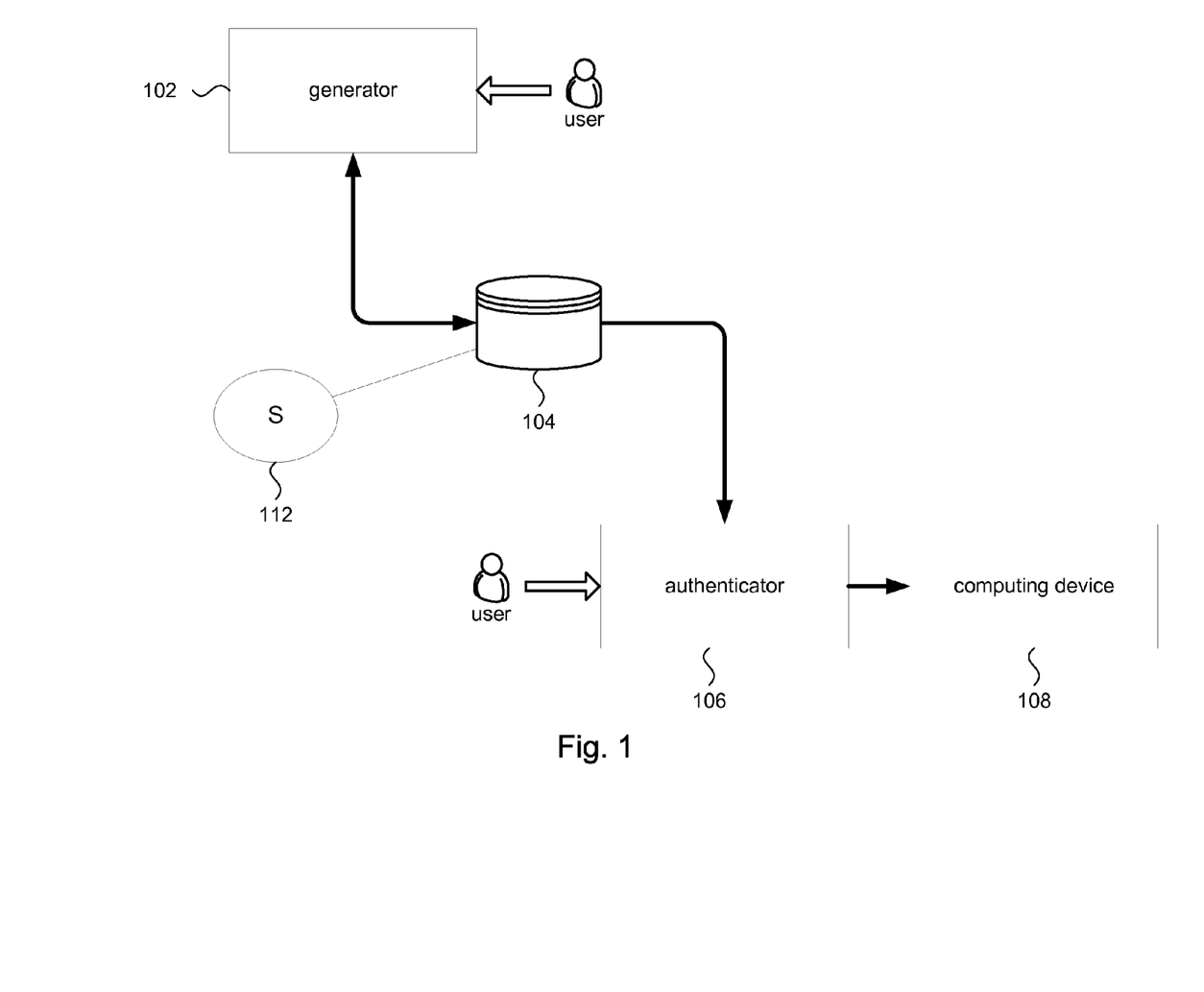
FIG. 1 is a high level system diagram of an embodiment illustrating authentication in accordance with the present disclosure.

In some embodiments, such as illustrated in FIG. 1, an authentication system may comprise a passcode generator 102, a passcode datastore 104, an authenticator 106, and a computing device 108. The passcode generator 102 may provide services to allow a user to provide a passcode, randomly generate a passcode, change their passcode, and the like. These services may be collectively referred to as passcode generation. The passcode datastore 104 may store passcodes provided to, randomly generated by, or changed within the passcode generator 102. In some embodiments, the passcode datastore 104 may store a passcode source set (S) 112. The passcode source set (S) 112 may be generated by the authentication system. For example, the passcode source set (S) 112 may comprise a set of randomly generated images, geometric patterns, and so on. In some embodiments, a user may supply their own passcode source set (S) 112. For example, the user may provide a set of pictures of their friends, or their own collection of symbols or images, and so on.

As will be explained below, the passcode source set (S) 112 may provide data to the passcode generator 102 for randomly generating passcodes and for confining provided or changed passcodes to only use segments from the passcode source set (S) 112. In some embodiments, the passcode data store 104 may store the passcode source set (S) 112 and passcodes generated by the passcode generator 102. In other embodiments, the passcode source set (S) 112 may be stored in a data store different from the passcodes generated by the passcode generator 102. In still other embodiments, passcodes generated by the passcode generator 102 may be stored in one or more different data stores.

Figure 1A:
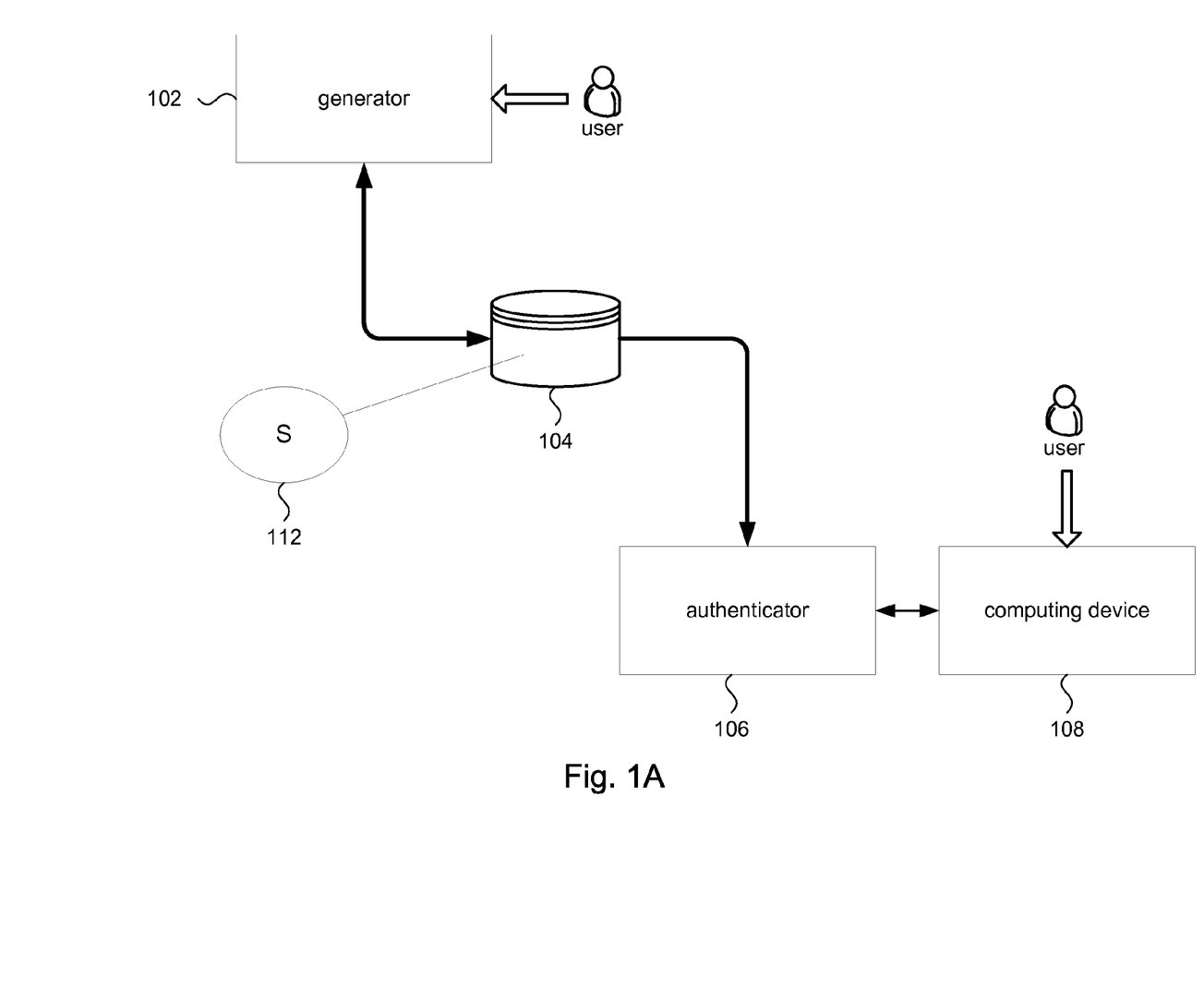
FIG. 1A is a high level system diagram illustrating authentication in accordance another embodiment.

The authenticator 106 may provide authentication services to grant or deny a user access to the computing device 108. In accordance with the present disclosure, the authenticator 106 may access the passcode data store 104 to use the passcode source set (S) 112 and a previously generated stored passcode to perform the authentication. In some embodiments, a user may directly access the authenticator 106 as depicted in FIG. 1. In other embodiments, the user may initiate access to the computing device 108 at the computing device, such as illustrated in FIG. 1A. The computing device 108 may communicate with the authenticator 106 to determine whether to grant or deny access to the user.

In some embodiments, the passcode generator 102, the passcode data store 104, the authenticator 106, and the computing device 108 may be hardware and/or software elements that are integrated in a single device; e.g., smartphone, desktop computer, STB, DVR, etc. In other embodiments, the passcode generator 102, the passcode data store 104, the authenticator 106, and the computing device 108 may be distributed among multiple separate computer systems. For example, in a large enterprise, the passcode generator 102 may be on a server that users in the enterprise access (e.g., over a communication network). The passcode data store 104 may be included in an enterprise data server system. Several instances of the authenticator 106 may deployed throughout the enterprise, for example as servers, providing authentication services to access various resources in the enterprise.

In some embodiments, the passcode data store 104 may store multiple unique passcodes. Each passcode may be related to a distinct user profile or login name. All such user profiles may be considered equal, users' profiles may be grouped or tiered in some manner related to allowed functionality or one such profile may be deemed related to the primary device owner. For example, the primary device owner may be the person that bought the device or pays the bills for any related communication services. Secondary device users may be allowed by the primary device owner (as would be common in a family sharing a tablet or DVR).

Figure 2:
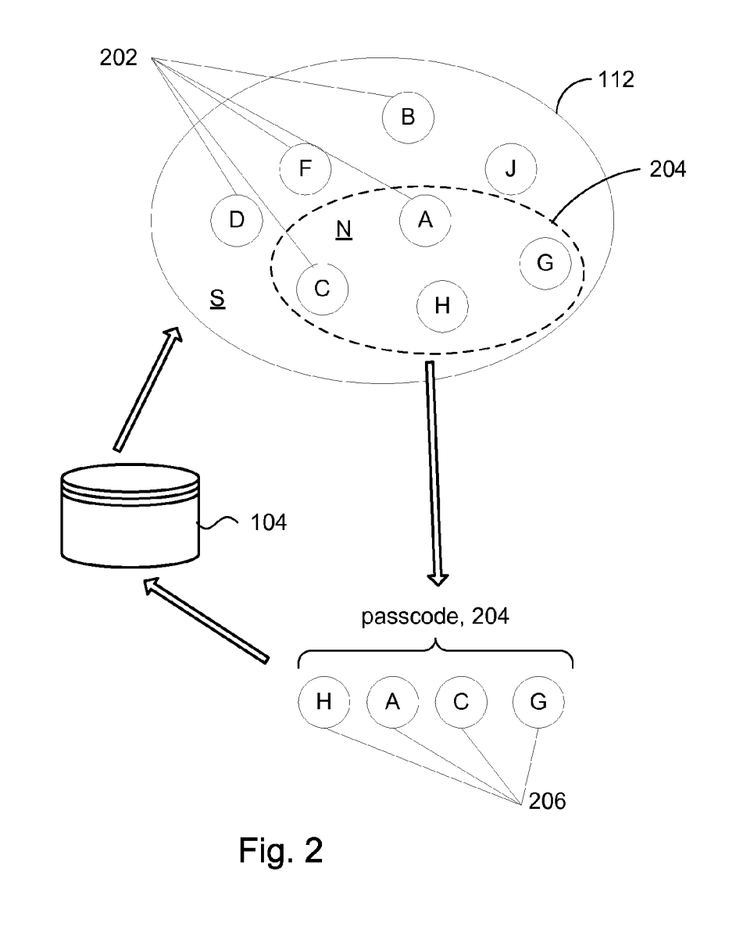
FIG. 2 illustrates passcode generation in accordance with the present disclosure.

FIG. 2 illustrates a logical representation of the passcode source set (S) 112 in accordance with some embodiments. The passcode source set (S) 112 may comprise a set of segments 202. The segments 202 may represent images, video clips, audio clips, printable characters, and so on. Using the passcode generator 102, a user may select a subset (N) 204 from the passcode source set (S) 112. The subset (N) 204 may constitute a passcode. Segments 206 which constitute the passcode 204 may be referred to as passcode segments. In some embodiments, the passcode 204 is an ordered set; i.e., the passcode segments 206 have an order. Thus, for example, the passcode 204 example shown in FIG. 2 comprises the passcode segments A, C, G, and H. The passcode segments A, C, G, and H, which define the passcode 204, are further defined with an order, namely H, A, C, and G.

Figure 3:
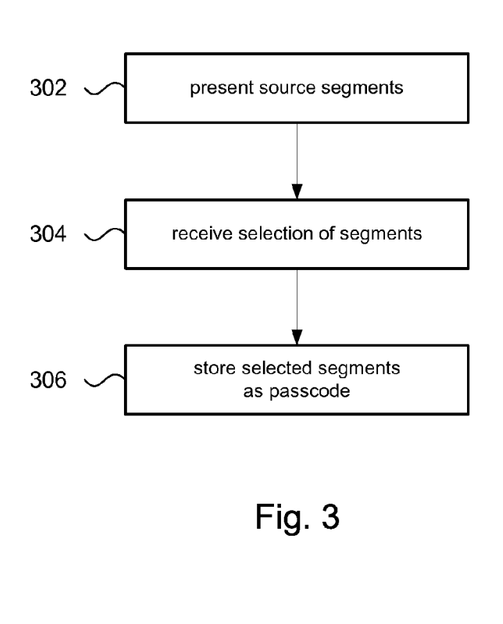
FIG. 3 illustrates a workflow for passcode generation in accordance with the present disclosure.

FIG. 3 shows a workflow for passcode generator 102, in accordance with some embodiments. At block 302, the passcode generator 102 may access the passcode source set (S) 112 (e.g., from passcode data store 104) and present the passcode source set to the user, for example, on a display device. The specific way by which the passcode generator 102 presents the passcode source set (S) 112 to the user may vary depending on the nature of the segments 202 in the passcode source set (S). For example, if the passcode source set (S) 112 comprises alphanumeric characters, the passcode generator 102 may simply instruct the user to enter a passcode that contains only letters or digits, for example on their keyboard. If the passcode source set (S) 112 comprises images, the passcode generator 102 may display the images on the display device and provide a scroll bar to allow the user to scroll through a list of images. If the passcode source set (S) 112 comprises audio segments, the passcode generator 102 may graphically represent each audio segment on the display device. An audio segment can be played when the user selects the corresponding graphic.

In some embodiments, there may be different passcode source sets for different users, or for different purposes. For example, users in a financial department of a business may be presented with a first passcode source set "A", while users in an engineering department may be presented with a different passcode source set "B". Depending on the user, the passcode generator 102 may access and present a passcode source set (S) 112 that is associated with that user.

In some embodiments, there may be different passcode source sets for different functions. For example, installing software on a system may be associated with one passcode source set, while logging onto the system to use existing software may be associated with another passcode source set. The passcode generator 102 may first determine the functionality or access level to be secured, and then determine an appropriate passcode source set to present to the user.

At block 304, the user may specify the segments 202 from the passcode source set (S) 112 that was presented to the user, and provide their selection of segments to the passcode generator 102 as the passcode 204. In some embodiments, the user may specify an order to the segments 206 in the passcode 204. For example, the order in which the user selected the segments 206 may define the ordering of the passcode segments 206 in the passcode 204. At block 306, the passcode generator 102 may store the passcode 204 in a suitable data store; e.g., passcode data store 104.

Figure 4:
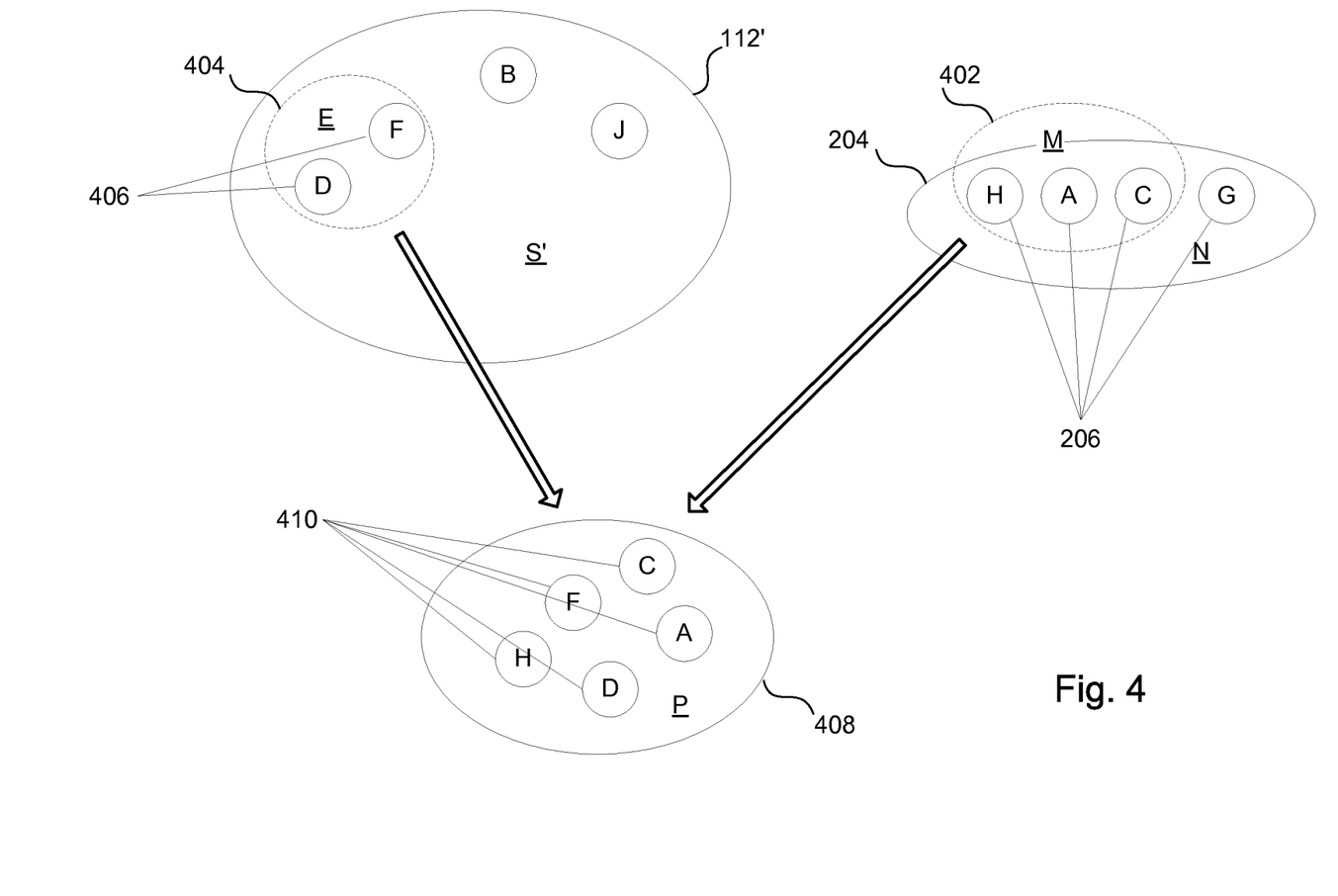
FIG. 4 illustrates a logical representation of a presentation of a challenge in accordance with the present disclosure.

FIG. 4 illustrates a logical representation for setting up an authentication challenge in accordance with principles of the present disclosure when there is only one authenticated device user or multiple authenticated users with the pending authenticated user precisely known (i.e., because it was assumed correctly, requested of the pending user, or inferred by face detection scan, etc). The authentication challenge includes presenting a presentation set (P) 408 to the user. The presentation set (P) 408 may comprise a subset (M) 402 of passcode segments 206 that comprise the passcode 204. In accordance with the present disclosure, the presentation set (P) 408 may further comprise distractor segments 406 of a distractor set (E) 404 obtained from a subset (S') 112' of the passcode source set (S) 112. In some embodiments, the subset (S') 112' of the passcode source set (S) 112 is the difference set, S−N; i.e., the passcode source set (S) 112 minus the subset (N) 204. The resulting presentation set (P) 408 comprises presentation segments 410 from the subset (M) 402 and the distractor set (E) 404.

In some embodiments supporting multiple authenticated users, the user may select his or her profile, the user may select his or her login name or the user may provide his or her login name before a presentation set (P) 408 is formed as above.

In some embodiments supporting multiple authenticated users, a default or expected or last user may be assumed and presented along with a presentation set (P) 408 to the user. The presentation set (P) 408 is formed as above. If the pending authenticated (i.e. authenticating) device user is not listed, they may initiate the user profile or login name collection step to replace the default or expected or last user which was otherwise assumed.

In some embodiments supporting multiple authenticated users sharing a common passcode source set (S) 112 (and which may be set by a primary device owner), a set of default or expected or recent users may be assumed and presented along with a presentation set (P) 408 to the user. The presentation set (P) 408 may comprise a sum of subset (M) 402 of passcode segments 206 that comprise the passcode 204 for each user in the set of default or expected or recent users. In accordance with the present disclosure, the presentation set (P) 408 may further comprise distractor segments 406 of a distractor set (E) 404 obtained from a subset (S') 112' of the passcode source set (S) 112. In some embodiments, the subset (S') 112' of the passcode source set (S) 112 is the difference set, S−sum(N); i.e., the passcode source set (S) 112 minus the sum of subset (N) 204 for each user in the set of default or expected or recent users. The resulting presentation set (P) 408 comprises presentation segments 410 from the sum of subset (M) 402 for each user in the set of default or expected or recent users and the distractor set (E) 404. If the pending authenticated (i.e. authenticating) device user is not listed in the set of default or expected or recent users, they may initiate the user profile or login name collection step as above to replace the default or expected or last user which was otherwise assumed.

Figure 5:
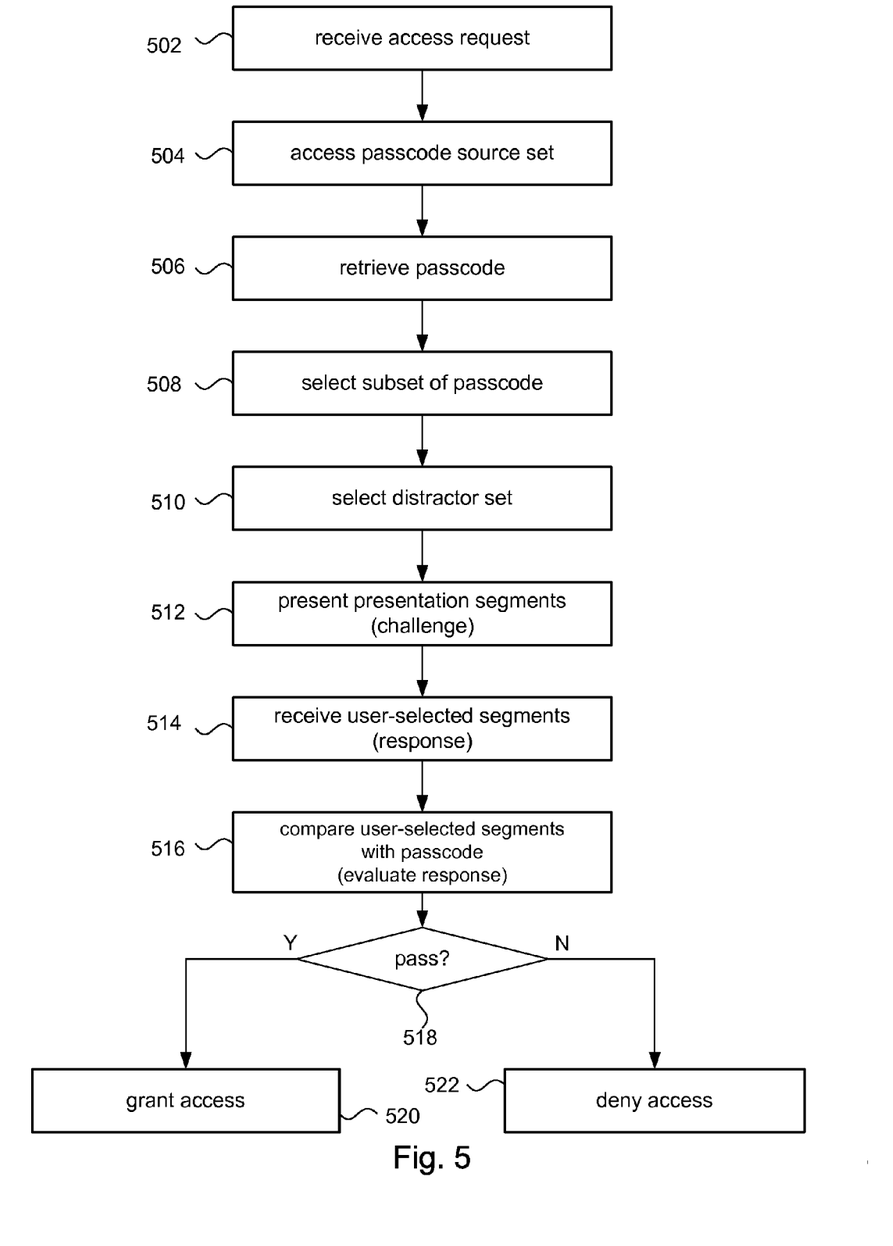
FIG. 5 illustrates a workflow for a challenge/response sequence.

FIG. 5 shows a workflow for the authenticator 106, in accordance with some embodiments. The authenticator 106 challenges the user by using a passcode 204 that is associated with the user in some way. The user may respond to the challenge, and if the response is successful the authenticator 106 may grant the user access to the computing device 108.

Figure 6A:
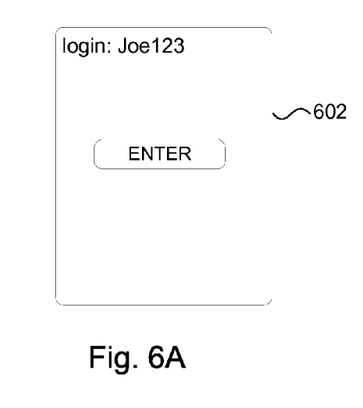
FIGS. 6A and 6B illustrate examples of a login screen.
Figure 6B:
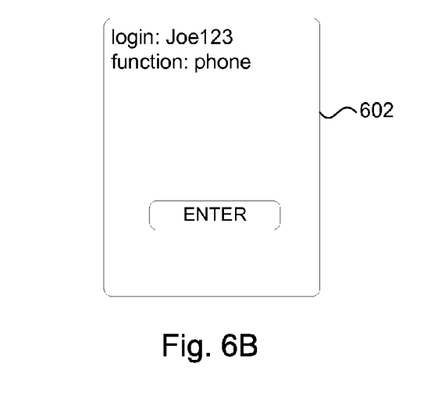

At a block 502, the authenticator 106 may receive an access request to access the computing device 108. Referring for a moment to FIG. 6A, an example of an access request may be a login sequence such as depicted in display 602 (e.g., a display component of computing device 108). FIG. 6B illustrates an example of an access request that includes identifying the functionality being accessed; e.g., using a phone function of the computing device 108. It might also be that no explicit user identity is displayed, as would be typical on certain personal mobile devices such as smartphones or early Android™ (Honeycomb-based or Ice Cream Sandwich-based) tablets.

Returning to FIG. 5, at block 504, the authenticator 106 may access the passcode source set (S) 112; e.g., from passcode data store 104. As explained earlier, different users or different access levels or functionalities being accessed may be associated with different passcode source sets. Accordingly, the authenticator 106 may select the passcode source set (S) 112 based on the nature of the access request; e.g., who is doing the access, what functionality is the access for, and so on.

At block 506, the authenticator 106 may retrieve a passcode 204; e.g., from passcode data store 104. The accessed passcode 204 will serve as the basis for challenging the user. In some embodiments, as explained above, the retrieved passcode 204 may depend on the user who is requesting access to the computing device 108. For example, the authenticator 106 may access the user's profile information and retrieve a passcode that is contained in the profile information. Similarly, in other embodiments, the passcode 204 that is retrieved may be based on the functionality being accessed. In still other embodiments, the passcode 204 that is retrieved may be based on both the user's identification and the function being accessed. More generally, the selection of the passcode 204 may depend other factors such as time of day, the user's location, and so on.

At block 508, the authenticator 106 may select a subset (M) 402 from the retrieved passcode 204 that was accessed in block 504. The segments in the subset (M) 402 may be randomly selected. In some embodiments, the segments in the subset (M) 402 may be selected via a scoreboard process wherein the unused segments of the retrieved passcode 204 are tracked to ensure constant changes in the selected subset (to better protect against the "shoulder surfing" attack). In other embodiments, the segments in the subset (M) 402 may be selected to exactly match the previous selection in cases where the last access was denied.

In some embodiments, the number of segments in the subset (M) 402 may vary depending on the nature of the access request; e.g., who is doing the access, what functionality is the access for, etc. The number of segments in the subset (M) 402 may also vary depending on the total number of recent accesses either with or without considering the status of the recent accesses (granted or denied), the delta time since the last granted access either with or without considering any intervening denied access, or considering the notion of the device being present on a person or in his hand since the last granted access with no intervening denied access.

In some embodiments, the size of the subset (M) 402 may depend on the desired level of security. For example, if a small number of segments in the subset (M) 402 is selected then an attacker trying to break the security may have an easier time at it because the small number of segments presents a smaller search space. This may be adequate for low security functionality such as making a phone call or checking one's calendar, for instance. However, higher security access (e.g., accessing a checking account) may require a larger number of segments in the subset (M) 402 to provide higher security against an event of an attack.

At block 510, in accordance with principles of the present disclosure, the authenticator 106 may identify a distractor set (E) 404 comprising one or more distractor segments 406. The authenticator 106 may select the distractor segments 406 from the same passcode source set (S) 112 that was used to generate the passcode 204. The distractor segments 406 may be randomly selected. In some embodiments, similar to the selection of segments in the subset (M) 402, the distractor segments 406 may be selected via a scoreboard process, in this case, to ensure that the segments not in the passcode 204 change at a rate similar to the changes seen in the segments in the subset (M) 402. The distractor segments 406 may be selected to exactly match the previous selection in cases where the last access was denied. The authenticator 106 may select the distractor segments 406 from the subset (S') 112', as shown in FIG. 4.

It is worth noting that FIG. 4 is a logical representation of the selection process, and that in a given implementation, the authenticator 106 need not actually generate the subset (S') 112'. Instead, for example, the authenticator 106 may randomly select a segment 202 from the passcode source set (S) 112. If the selected segment is a passcode segment 206 in the retrieved passcode 204 or is already in the distractor set (E) 404, then the selected segment is discarded. Otherwise, the selected segment is added to the distractor set (E) 404. This may continue until an appropriate number of distractor segments 406 have been selected.

Figure 6C:
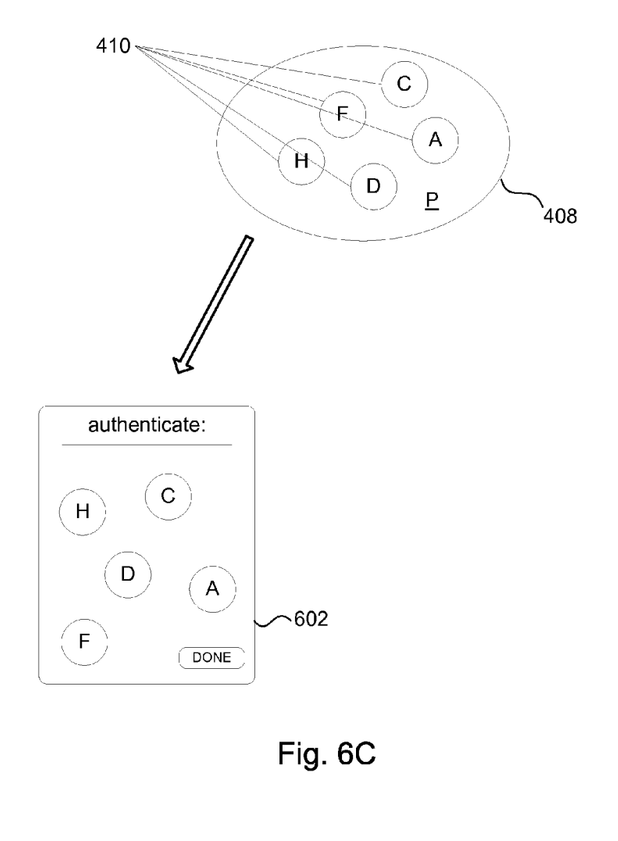
FIG. 6C illustrates an example of a challenge screen.

In some embodiments, the segments in the subset (M) 402 and the distractor segments 406 may constitute the presentation segments 410 of the presentation set 408 that the authenticator 106 presents to the user at block 512. The authenticator 106 may present the presentation segments 410 on a visual display or as audio or both, depending on the nature of the presentation segments. In accordance with the present disclosure, the authenticator 106 may display the presentation segments 410 in a random arrangement on a visual display device, or play the presentation segments in random order on an audio device. FIG. 6C illustrates an example showing presentation segments 410 presented on the display 602. In some embodiments, the presentation segments 410 may randomly arranged in a grid pattern (e.g., similar to an ATM keypad or numeric PIN unlock display of a smartphone but with graphic images or symbols associated with the presentation segments lain on the button faces), a circular pattern, or any other pattern.

At block 514, the user may respond to the challenge by inputting to the authenticator 106 their selection of one or more of the presented presentation segments 410. For example, on a touch screen device, the user may tap one or more of the presentation segments 410 that are displayed on the touch screen device. If the display is not touch sensitive, the user may indicate their selection by clicking with a mouse. Alternatively, the displayed presentation segments 410 may include accompanying identification information (e.g., letters or numbers), which may be suitable if the presentation segments are images. The user may enter a sequence of letters or numbers that correspond to their selection of presentation segments 410.

Figure 6D:
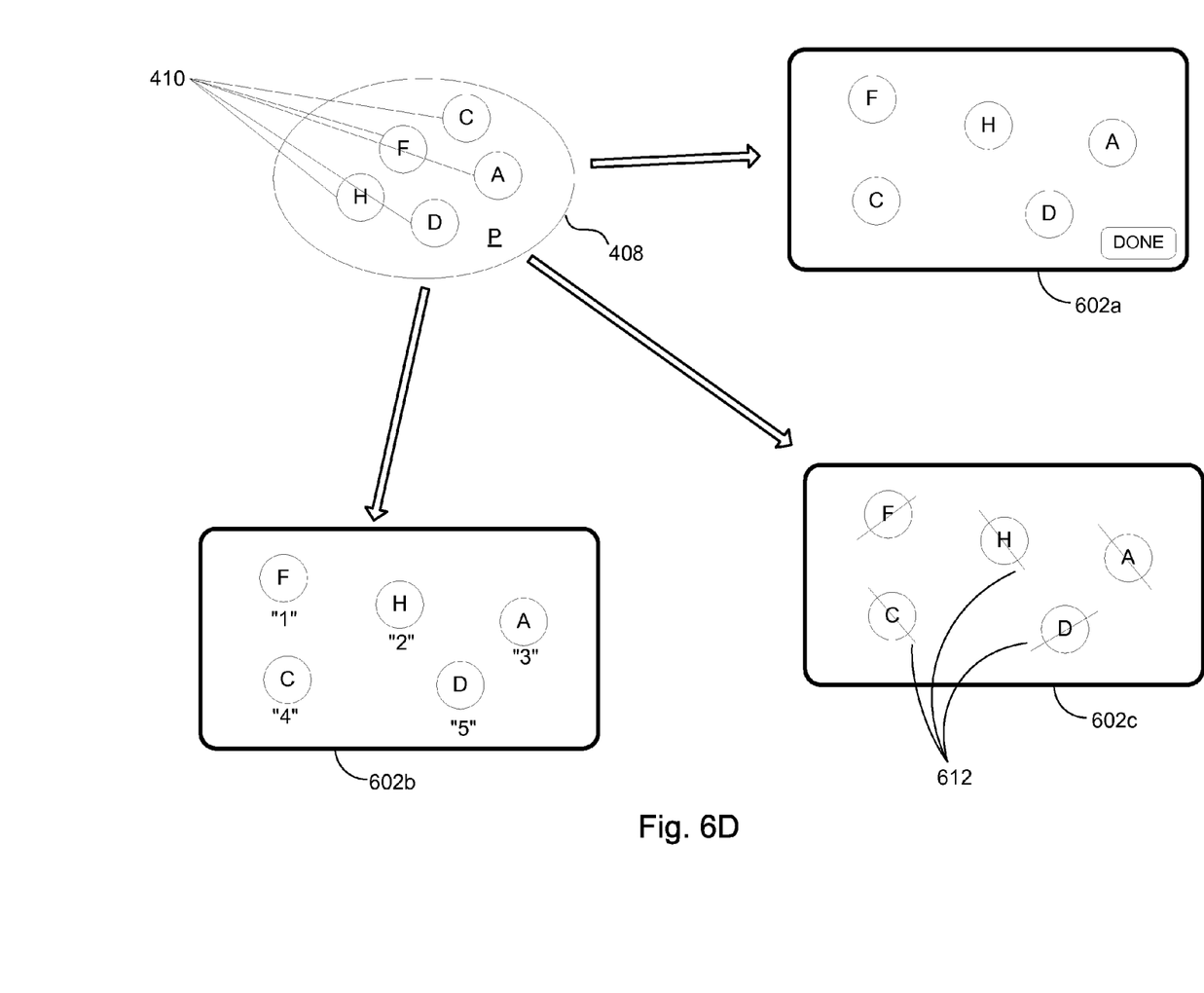
FIG. 6D illustrates additional aspects of a challenge screen.

FIG. 6D shows examples of displays of the presentation segments 410 in accordance with some embodiments. Using the example presented in FIG. 4, the presentation segment 410 comprises the subset (M) 402 from the passcode 204 (namely, segments H, A, and C) and the distractor set (E) 404 (namely, segments D and F). Display 602*a* illustrates an example of a random display of the presentation segments 410. The user may tap or mouse click one or more of the presentation segments 410 presented on the display 602*a*. The display 602*a* may include a DONE button to indicate to the authenticator 106 that the user has made their selection. In some embodiments, a DONE button may not be required if the size of subset (M) 402 is fixed or if the authenticator 106 compares user-selected segments with the passcode 204 after each segment selection for a grant access condition.

Display 602*b* illustrates an example of displaying the presentation segments 410 with accompanying identifying information, in this case digits. The user may enter a sequence of digits to specify their selection of presentation segments 410. For example, if the user wishes to select the presentation segments H, D, C, in that order, the user may enter "2", "5", "4" on their keyboard.

Returning to FIG. 5, if the presentation segments 410 comprise audio data, the authenticator 106 may play each of the presentation segments on the user's device. After hearing the list, the user may "speak" into their device to indicate their selection of the presentation segments 410. Alternatively, the authenticator 106 may play each presentation segment 410 on the user's device and pause after each presentation segment to allow the user to indicate a selection, for example, by pressing a button on the device.

In some embodiments, the authenticator 106 may determine the order of the user's selection of presentation segments 410. On a visual display, the authenticator 106 may determine the order from the order of the user's taps or mouse clicks. If the user entered their selection using a keyboard, or other such input device, the authenticator 106 may determine the order from the sequence of the user's key presses. For audio-type presentation segments 410, the order may be determined from the order of the user's spoken input. Alternatively, the authenticator 106 may play the list of presentation segments 410 several times. The first time around, the user may listen for and select the first presentation segment in their selection. The second time around, the user may listen for and select the second presentation segment in their selection, and so on until the user has completed their selection of presentation segments 410.

In some embodiments, a watermark, a set of watermarks, or other identifying marking may accompany each presentation segment 410 that is presented to the user. Referring again to FIG. 6D, display 602*c* illustrates an example of watermarking each presentation segment 410 with a watermark 612. The watermark may serve as a mnemonic to trigger the user's recollection as to which of the displayed presentation segments 410 belong to the passcode 204. Thus, for example, the passcode segments C H A from the passcode 204 may have the same watermark (e.g., backslash character) so as to allow the user to identify the segments as being from the passcode 204. The other presentation segments (i.e., the distractor segments) may have a different watermark (e.g., forward slash character). In some embodiments, the watermark display may be toggled ON and OFF (e.g., by tapping the space bar). This may allow the user to have a quick glance at the watermarks, while at the same time reducing the risk of a security breach due to shoulder surfing.

In some embodiments, a set of watermarks may accompany each presentation segment 410 that is presented to the user. There is a particular watermark keyed to those segments related to the passcode 204. This particular watermark may be selected by the user when they generate their passcode or it may be randomly assigned on a per authentication basis. Any additional watermarks are distributed to all segments of the presentation segment 410 at the same or similar density as the particular watermark keyed to those segments related to the passcode 204. Under this arrangement, each presentation segment 410 may be covered by more than one watermark of a different kind.

In some embodiments, the watermarks that are displayed with the passcode segments (e.g., C H A) may not be of the same image, but rather may share some characteristic. The watermarks that are displayed with the distractor segments would not share that characteristic. For example, each passcode segment may have a different watermark but is displayed in red; the distractor segments may use the same watermarks but in a different color. Using a characteristic to identify common watermarks may provide more security against shoulder surfing, since the shoulder surfer may not readily appreciate which of the watermarks identify passcode segments and which do not.

Returning to FIG. 5, at block 516, the authenticator 106 may evaluate the user's response. In accordance with the present disclosure, the evaluation may include comparing the user's selection of presentation segments 410 with the passcode 204 retrieved at block 506. In some embodiments, if the user's selection of presentation segments 410 contains only segments that belong to the passcode 204, then the authenticator 106 may grant access to the user via blocks 518 and 520, otherwise access may be denied at block 522. In other embodiments, access may be granted only if the order of the segments in the user's selection of presentation segments 410 matches the order of those same segments as they are defined in the passcode 204. In embodiments where passcode 204 order is imposed, it is possible to support cases where passcode 204 contains the same segment multiple times similar to how an ATM PIN may contain the same digit multiple times.

In some embodiments supporting multiple authenticated users, a set of passcode 204 used to generate presentation set (P) 408 needs to be considered against the user's selection of presentation segments 410. Access is denied if all possible matches fail. Access for the related user of the set of default or expected or recent users used to generate presentation set (P) 408 is granted if a particular match is found.

The example shown in FIG. 4 will be used to illustrate some examples. The passcode 204 contains the following passcode segments 206 in the following order: H A C G. The distractor set (E) 404 contains the following distractor segments 406: D F. The resulting presentation set (P) 408 contains the following presentation segments 410: A C D F H. As explained above, the presentation segments 410 may be presented to the user in random order, see for example, the display 602 in FIG. 6C.

Suppose the user selects the following presentation segments (e.g., by tapping on a touch sensitive display): H F D.

The authenticator 106 would deny access (e.g., via blocks 518 and 522 of FIG. 5) because the user's selection of the presentation segments (H F D) does not contain only segments that belong to the passcode 204; segments F and D are not in the passcode 204.

Suppose the user selects the following presentation segments (e.g., by tapping on a touch sensitive display): H A C D. The authenticator 106 would deny access (e.g., via blocks 518 and 522) because the user's selection of the presentation segments (H A C D) does not contain only segments that belong to the passcode 204; segment D is not in the passcode 204.

Suppose the user selects the following presentation segments (e.g., by tapping on a touch sensitive display) in the following order: A C H. In an embodiment where segment ordering is not imposed, the authenticator 106 would grant access (e.g., via blocks 518 and 520) because the user's selection of the presentation segments (A C H) contains only segments that belong to the passcode 204, despite the difference in the order; the user's selection is A C H, while the order of those same segments in the passcode 204 is H A C.

In an embodiment where segment ordering is imposed, the authenticator 106 would deny access because the user's selection of the presentation segments (A C H) occurs in a different order than their order in the passcode 204, namely H A C, despite that the user's selection contains only segments that belong to the passcode 204.

Suppose the user selects the following presentation segments in the following order: H A C. In an embodiment where segment ordering is imposed, the authenticator 102 would grant access because the user's selection of the presentation segments (H A C) contains only segments that belong to the passcode 204, and the selected segments appear in the same order as they appear in the passcode 204, namely H A C.

To illustrate yet another example that is not depicted in the figures, consider the following configuration:
  passcode set (N) 204: H A C G (ordered set)
  subset (M) 402 contains: A G H
  distractor set (E) 404 contains: D F
  presentation set (P) 408 contains: A D F G H (displayed in random order)

Suppose the user selects the following presentation segments in the following order: H A G. In an embodiment where segment ordering is imposed, the authenticator 106 would grant access because the user's selection of the presentation segments (H A G) contains only segments that belong to the passcode 204, and the selected segments appear in the same order as they appear in the passcode 204, namely H A G. Notice that the segment C in the passcode 204 is skipped over when comparing the user's selection with the passcode (e.g., at block 516). The skipped segment C is not considered in the comparison because it was not in the subset (M) 402.

In some embodiments where segment ordering is imposed, the user may select any segment from distractor set (E) 404 when the segment they know from passcode 204 is missing from the presentation set (P) 408. In this case, authenticator 106 may evaluate responses while considering passcode 204 using subset (M) 402 to determine which user selections are to be ignored rather than skipped as described above.

In some embodiments where segment ordering is imposed, the user may select any segment from presentation set (P) 408 when the segment they know from passcode 204 is missing from the presentation set (P) 408. In this case, authenticator 106 would evaluate responses while considering passcode 204 using subset (M) 402 to determine which user selections are to be ignored rather than skipped as described above.

Figure 7:
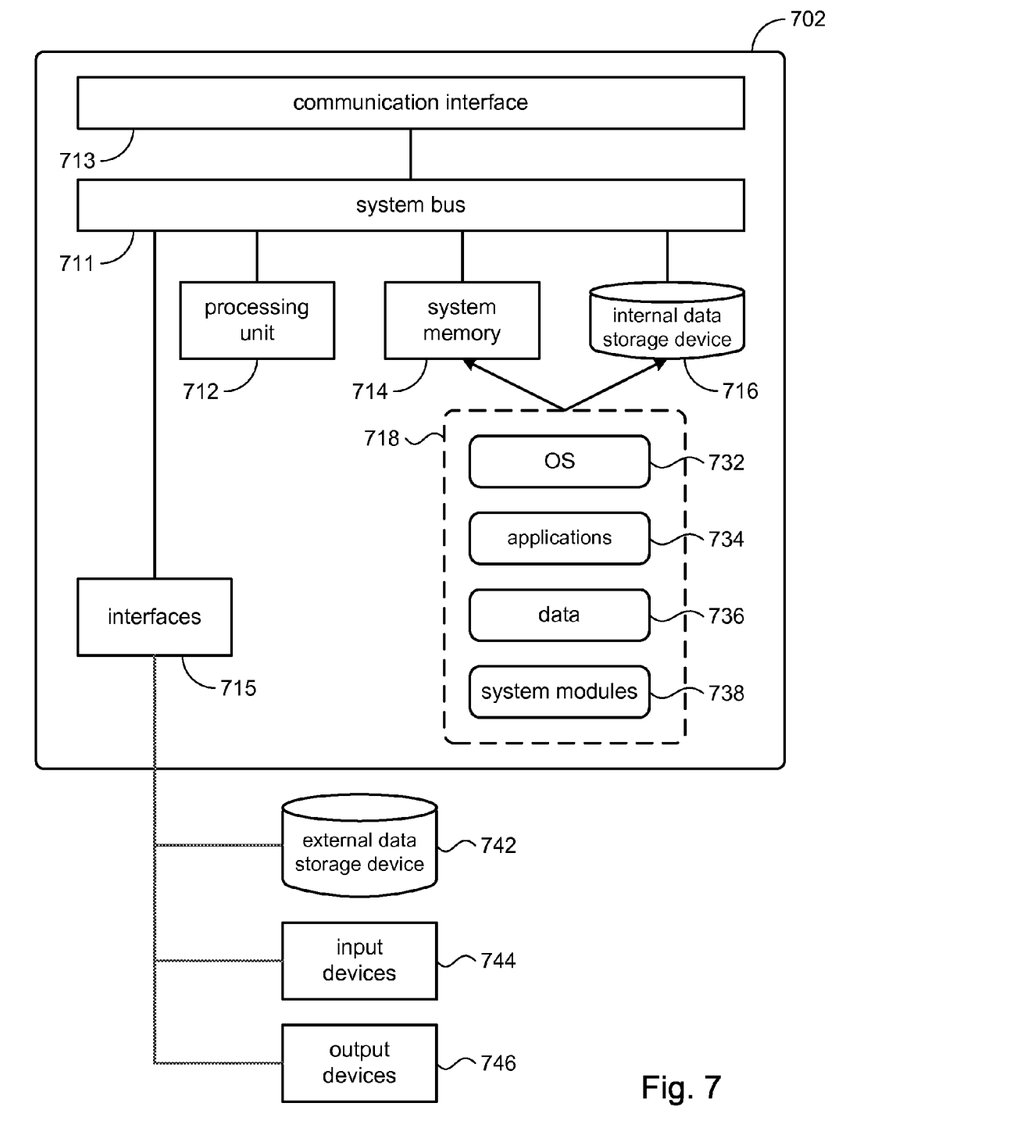
FIG. 7 is a high level block diagram illustrating a specific embodiment for authentication in accordance with the present disclosure.

Referring to FIG. 7, the passcode generator 102, the authenticator 106, and the computing device 108 may be implemented in a computer system 702, or among multiple computer systems. In a typical implementation, the computer system 702 may include a processing unit 712, a system memory 714, and a system bus 711. The system bus 711 may connect various system components including, but not limited to, the processing unit 712, the system memory 714, an internal data storage device 716, and a communication interface 713. In a configuration where the computer system 702 is a mobile device (e.g., smartphone, computer tablet), the internal data storage 716 may or may not be included.

The processing unit 712 may comprise a single-processor configuration, or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 702 is a mobile device, the internal data storage 716 may be a flash drive.

The internal data storage device 716 and its associated non-transitory computer-readable media provide nonvolatile storage of data, data structures, computer-executable instructions, and so forth. Although the description of computer-readable media above refers to an HDD, a removable magnetic diskette, and a removable optical media such as a CD or DVD, it is noted that other types of non-transitory computer-readable media, such as zip drives, magnetic cassettes, flash memory cards, cartridges, and the like may also be used, and further, that any such media may contain computer-executable instructions for performing the methods disclosed herein.

The system memory 714 and/or the internal data storage device 716 may store a number of program modules, including an operating system 732, one or more application programs 734, program data 736, and other program/system modules 738. For example, the application programs 734, which when executed, may cause the computer system 702 to provide the function of passcode generator 102. The application programs 734, for example, may include programming for the authenticator 106 to perform method steps of FIG. 5.

An external data storage device 742 may be connected to the computer system 702. For example, the external data storage device 742 may be the passcode data store 104 shown in FIG. 1. In some embodiments, the internal data storage device 716 may serve the passcode data store 104.

Access to the computer system 702 may be provided by a suitable input device 744 (e.g., keyboard, mouse, touch pad, etc.) and a suitable output device 746 (e.g., a video device such as video display 602 (FIG. 6A), and/or a video controller or graphics controller for providing video data to video display 602, etc.). In a configuration where the computer system 702 is a mobile device, input and output may be provided by a touch sensitive display. The input device 744 may be a virtual keyboard displayed on the touch sensitive display.

The various embodiments described herein may employ various computer-implemented operations involving data stored in computer systems. For example, the various embodiments described herein may employ various computer-implemented operations involving data stored in computer systems. For example, these operations may require physical manipulation of physical quantities; usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

The invention claimed is:

1. A computer-implemented method for passcode authentication, wherein the passcode comprises a plurality of passcode segments, the computer-implemented method comprising:
   receiving a request from a user for access to a computing device;
   presenting to the user a plurality of presentation segments comprising a subset of passcode segments from the plurality of passcode segments and a plurality of distractor segments;
   receiving information from the user that is representative of a plurality of user-selected segments selected from among the plurality of presentation segments; and
   if the plurality of user-selected segments that are received comprise only the subset of passcode segments presented to the user in the plurality of presentation segments, then granting the user access to the computing device;
   wherein a size of the subset of the passcode segments in the plurality of presentation segments increases with successive unsuccessful authentication attempts.

2. The computer-implemented method of claim 1, wherein the plurality of passcode segments comprising the passcode constitute an ordered set of passcode segments, and wherein granting the user access to the computing device occurs if the plurality of user-selected segments further are selected in an order same as an order of the plurality of user-selected segments in the ordered set of passcode segments comprising the passcode.

3. The computer-implemented method of claim 1, wherein a passcode is defined for each user among a plurality of users, wherein the plurality of presentation segments comprises a subset of passcode segments from each passcode of each user.

4. The computer-implemented method of claim 3, wherein a specific user is identified from among the plurality of users when the plurality of user-selected segments that are received comprise only one of the subset of passcode segments presented to the user in the plurality of presentation segments.

5. The computer-implemented method of claim 1, wherein the plurality of presentation segments are visually presented.

6. The computer-implemented method of claim 5, wherein the plurality of presentation segments that are part of the subset of passcode segments are displayed with watermarks of a first kind, wherein the plurality of presentation segments that are part of the plurality of distractor segments are displayed with watermarks of a second kind that is different from the watermarks of the first kind.

7. The computer-implemented method of claim 1, wherein the plurality of presentation segments are presented to the user in a random order.

8. The computer-implemented method of claim 1, wherein the plurality of passcode segments and the plurality of distractor segments are images, or audio data, or a combination of images and audio data.

9. The computer-implemented method of claim 1, wherein the plurality of passcode segments and the plurality of distractor segments are selected from a common source of segments.

10. The computer-implemented method of claim 1, wherein a size of the subset of passcode segments in the plurality of presentation segments varies depending on a kind of access requested by the user.

11. The computer-implemented method of claim 1, wherein a size of the subset of the passcode segments in the plurality of presentation segments varies depending on an identity of the user.

12. The computer-implemented method of claim 1, wherein the plurality of subset of passcode segments are determined using a scoreboard process.

13. The computer-implemented method of claim 1, wherein the plurality of distractor segments are determined using a scoreboard process.

14. A computer system comprising:
   a processor;
   a video device; and
   a non-transitory data storage device having stored thereon computer executable program code, which when executed by the processor, causes the processor to:
      receive a request for access to the computer system, the request for access including a user name or a function to be accessed on the computer system;
      display a plurality of images using the video device, in response to the request for access, the plurality of images representing fewer than a complete set of passcode segments that comprise a passcode that is associated with the requested access, the plurality of images further representing a plurality of distractor segments which are not part of the passcode, the plurality of images being arranged on the video device in a random order;
      receive input from a user indicative of selections of some of the plurality of images displayed on the video device; and
      grant access to the computer system when the user selects images from the plurality of images displayed on the video device which represent passcode segments that belong to the complete set of passcode segments comprising the passcode;
      with one or more successive denials of access to the computer system when the user selects images from the plurality of images displayed on the video device which do not represent passcode segments that belong to the complete set of passcode segments comprising the passcode, increasing a number of the fewer than complete set of passcode segments in the plurality of images.

15. The computer system of claim 14 wherein access is granted to the computer system when the user selects only those images from the plurality of images displayed on the video device which represent passcode segments that belong to the complete set of passcode segments comprising the passcode.

16. The computer system of claim 14 wherein the complete set of passcode segments comprising the passcode constitute an ordered set of passcode segments, wherein the user is granted access to the computer system when the user selects images from the plurality of images displayed on the video device which represent passcode segments that belong to the complete set of passcode segments comprising the passcode and in a same order as in the complete set of passcode segments.

17. The computer system of claim 16 wherein images selected by the user include images that represent segments that do not belong to the passcode or do not belong to the passcode in the correct order, wherein the processor ignores such segments.

18. The computer system of claim 14 wherein the plurality of images that represent passcode segments are displayed with watermarks of a first kind, wherein the plurality of images that represent distractor segments are displayed with a watermark of a second kind that is different from the watermarks of the first kind.

19. The computer system of claim 14, wherein the computer executable program code, which when executed by the processor, further causes the processor to:
    display a plurality of source segments using the video device;
    receive input indicative of a plurality of selections of the plurality of source segments; and
    store the plurality of selections as the passcode.

20. A computer-implemented method for authentication comprising:
    presenting a challenge to a user who has requested access to a computer, including presenting on an output device a plurality of first information and a plurality of second information, wherein the plurality of first information are representative of only a portion of a passcode that is associated with the requested access, and wherein the plurality of second information are not representative of any portion of the passcode;
    granting access to the user if a selection from the user comprises only the plurality of first information from among the plurality of first information and the plurality of second information that are presented on the output device; and
    with one or more successive denials of access to the user if a selection from the user does not comprise only the plurality of first information from among the plurality of first information and the plurality of second information that are presented on the output device, increasing an amount of the plurality of first information from among the plurality of first information.

21. The computer-implemented method of claim 20, wherein the amount of the plurality of first information that is presented on the output device in the challenge varies depending on a type of the requested access.

22. The computer-implemented method of claim 20, wherein the passcode comprises images and the plurality of first information and the plurality of second information comprise images displayed on the output device.

23. The computer-implemented method of claim 20, wherein information comprising the passcode is characterized by having an order, and wherein the user is granted access to the user if the selection from the user comprises only the plurality of first information from among from among the plurality of first information and the plurality of second information that are presented on the output device as in the order as characterized in the passcode.

24. The computer-implemented method of claim 20, wherein the plurality of first information and the plurality of second information are images, wherein images associated with the plurality of first information include identifying marks of a first kind, and wherein images associated with the plurality of second information include identifying marks of a second kind different from the first kind.

* * * * *